US011966939B1

(12) United States Patent
Devereaux et al.

(10) Patent No.: US 11,966,939 B1
(45) Date of Patent: *Apr. 23, 2024

(54) DETERMINING APPLIANCE INSURANCE COVERAGE/PRODUCTS USING INFORMATIC SENSOR DATA

(71) Applicant: United Services Automobile Association (USAA), San Antonio, TX (US)

(72) Inventors: Ramsey Devereaux, San Antonio, TX (US); Michael J. Allen, San Antonio, TX (US); Spencer Read, Helotes, TX (US); David S. Franck, San Antonio, TX (US); William M. Chandler, San Antonio, TX (US); Daniela M. Wheeler, Borne, TX (US); Kathleen L. Swain, Peoria, AZ (US)

(73) Assignee: United Services Automobile Association (USAA), San Antonio, TX (US)

( * ) Notice: Subject to any disclaimer, the term of this patent is extended or adjusted under 35 U.S.C. 154(b) by 144 days.

This patent is subject to a terminal disclaimer.

(21) Appl. No.: 17/466,685

(22) Filed: Sep. 3, 2021

Related U.S. Application Data

(63) Continuation of application No. 15/868,923, filed on Jan. 11, 2018, now Pat. No. 11,113,765, which is a
(Continued)

(51) Int. Cl.
*G06Q 40/08* (2012.01)
*G06Q 30/0207* (2023.01)
*G06Q 40/00* (2023.01)

(52) U.S. Cl.
CPC ......... *G06Q 30/0215* (2013.01); *G06Q 40/08* (2013.01); *G06Q 40/00* (2013.01)

(58) Field of Classification Search
None
See application file for complete search history.

(56) References Cited

U.S. PATENT DOCUMENTS 4,090,371 A * 5/1978 Keane ............... F04B 49/10
62/193
5,182,705 A 1/1993 Barr et al.
(Continued)

FOREIGN PATENT DOCUMENTS

| AT | 503861 B1 | 6/2008 |
|---|---|---|
| CA | 2478911 A1 | 9/2003 |

(Continued)

OTHER PUBLICATIONS

Prognostics-based product warranties IEEE 2013 (Year: 2013).*
(Continued)

*Primary Examiner* — Bruce I Ebersman
(74) *Attorney, Agent, or Firm* — Fletcher Yoder, P.C.

(57) ABSTRACT

A computer device and method for processing risk related data to determine one or more insurance products for appliances and other systems located in or on an insured property. Informatic data is received from one or more informatic sensor devices relating to one or more appliances located in or on an insured property. Analysis is performed on the received informatic data to determine one or more insurance products to be recommended for at least one appliance located in or on the insured property. Notification is provided regarding determination of the one or more insurance products for the at least one appliance located in or on the insured property.

20 Claims, 4 Drawing Sheets

Related U.S. Application Data continuation of application No. 14/324,759, filed on Jul. 7, 2014, now Pat. No. 9,886,723.

(60) Provisional application No. 61/948,192, filed on Mar. 5, 2014, provisional application No. 61/943,906, filed on Feb. 24, 2014, provisional application No. 61/943,897, filed on Feb. 24, 2014, provisional application No. 61/943,901, filed on Feb. 24, 2014, provisional application No. 61/926,541, filed on Jan. 13, 2014, provisional application No. 61/926,534, filed on Jan. 13, 2014, provisional application No. 61/926,532, filed on Jan. 13, 2014, provisional application No. 61/926,536, filed on Jan. 13, 2014, provisional application No. 61/926,091, filed on Jan. 10, 2014, provisional application No. 61/926,123, filed on Jan. 10, 2014, provisional application No. 61/926,108, filed on Jan. 10, 2014, provisional application No. 61/926,098, filed on Jan. 10, 2014, provisional application No. 61/926,114, filed on Jan. 10, 2014, provisional application No. 61/926,119, filed on Jan. 10, 2014, provisional application No. 61/926,111, filed on Jan. 10, 2014, provisional application No. 61/926,118, filed on Jan. 10, 2014, provisional application No. 61/926,093, filed on Jan. 10, 2014, provisional application No. 61/926,121, filed on Jan. 10, 2014, provisional application No. 61/926,095, filed on Jan. 10, 2014, provisional application No. 61/926,103, filed on Jan. 10, 2014.

(56) References Cited

U.S. PATENT DOCUMENTS

| | | | |
|---|---|---|---|
| 5,235,507 A | 8/1993 | Sackler et al. | |
| 5,325,291 A | 6/1994 | Garrett et al. | |
| 5,526,609 A | 6/1996 | Lee et al. | |
| 5,621,662 A | 4/1997 | Humphries et al. | |
| 5,724,261 A | 3/1998 | Denny et al. | |
| 5,950,169 A | 9/1999 | Borghesi et al. | |
| 5,960,338 A | 9/1999 | Foti | |
| 5,991,733 A | 11/1999 | Aleia et al. | |
| 6,029,141 A | 2/2000 | Bezos et al. | |
| 6,049,773 A | 4/2000 | McCormack et al. | |
| 6,141,686 A | 10/2000 | Jackowski et al. | |
| 6,330,546 B1* | 12/2001 | Gopinathan | H04M 15/47 705/38 |
| 6,404,871 B1* | 6/2002 | Springer | H04M 15/47 379/189 |
| 6,526,807 B1 | 3/2003 | Doumit et al. | |
| 6,686,838 B1 | 2/2004 | Rezvani et al. | |
| 6,766,322 B1 | 7/2004 | Bell | |
| 6,826,607 B1 | 11/2004 | Gelvin et al. | |
| 6,892,317 B1* | 5/2005 | Sampath | G06F 11/25 714/E11.155 |
| 6,983,368 B2* | 1/2006 | Wheeler | H04L 9/3247 380/282 |
| 6,985,907 B2 | 1/2006 | Zambo et al. | |
| 7,015,789 B1 | 3/2006 | Helgeson | |
| 7,138,914 B2 | 11/2006 | Culpepper et al. | |
| 7,139,731 B1* | 11/2006 | Alvin | G06Q 30/0603 705/76 |
| 7,142,099 B2 | 11/2006 | Ross et al. | |
| 7,148,808 B1* | 12/2006 | Pfahlert | G01R 31/382 340/636.13 |
| 7,170,418 B2 | 1/2007 | Rose-Pehrsson et al. | |
| 7,203,654 B2 | 4/2007 | Menendez | |
| 7,263,506 B2* | 8/2007 | Lee | G06Q 20/4016 705/318 |
| 7,333,923 B1* | 2/2008 | Yamanishi | G06Q 10/06395 706/14 |
| 7,376,618 B1* | 5/2008 | Anderson | G06Q 40/12 705/38 |
| 7,398,218 B1 | 7/2008 | Bernaski et al. | |
| 7,403,922 B1* | 7/2008 | Lewis | G06Q 20/40 705/38 |
| 7,406,436 B1 | 7/2008 | Reisman | |
| 7,602,196 B2 | 10/2009 | Vokey | |
| 7,610,210 B2 | 10/2009 | Helitzer et al. | |
| 7,624,031 B2 | 11/2009 | Simpson et al. | |
| 7,624,069 B2 | 11/2009 | Padgette | |
| 7,711,584 B2 | 5/2010 | Helitzer et al. | |
| 7,716,076 B1 | 5/2010 | Block et al. | |
| 7,739,133 B1 | 6/2010 | Hail et al. | |
| 7,760,862 B2* | 7/2010 | Marchand | H04M 15/00 379/189 |
| 7,809,587 B2 | 10/2010 | Dorai et al. | |
| 7,869,944 B2 | 1/2011 | Deaton et al. | |
| 7,885,831 B2 | 2/2011 | Burton et al. | |
| 7,899,560 B2 | 3/2011 | Eck | |
| 7,937,437 B2 | 5/2011 | Fujii | |
| 7,945,497 B2 | 5/2011 | Kenefick et al. | |
| 7,945,524 B2 | 5/2011 | Anderson et al. | |
| 7,949,548 B2 | 5/2011 | Mathai et al. | |
| 7,958,184 B2 | 6/2011 | Barsness et al. | |
| 7,969,296 B1 | 6/2011 | Stell | |
| 7,970,701 B2* | 6/2011 | Lewis | G06Q 20/4016 705/38 |
| 7,980,161 B2* | 7/2011 | Sussmeier | B26D 7/12 83/72 |
| 8,004,404 B2 | 8/2011 | Izumi et al. | |
| 8,032,448 B2* | 10/2011 | Anderson | G06Q 40/12 705/38 |
| 8,041,636 B1* | 10/2011 | Hunter | G06Q 40/06 705/40 |
| 8,046,243 B2 | 10/2011 | Winkler | |
| 8,069,068 B1* | 11/2011 | Billman | G06Q 40/04 463/25 |
| 8,069,181 B1 | 11/2011 | Krishnan et al. | |
| 8,081,795 B2 | 12/2011 | Brown | |
| 8,082,349 B1* | 12/2011 | Bhargava | H04L 63/1416 709/227 |
| 8,086,523 B1 | 12/2011 | Palmer | |
| 8,090,598 B2 | 1/2012 | Bauer et al. | |
| 8,095,394 B2 | 1/2012 | Nowak et al. | |
| 8,103,527 B1 | 1/2012 | Lasalle et al. | |
| 8,106,769 B1 | 1/2012 | Maroney et al. | |
| 8,229,767 B2 | 7/2012 | Birchall | |
| 8,229,771 B1* | 7/2012 | Billman | G06Q 40/08 705/7.41 |
| 8,249,968 B1 | 8/2012 | Oldham et al. | |
| 8,265,963 B1 | 9/2012 | Hanson et al. | |
| 8,271,303 B2 | 9/2012 | Helitzer et al. | |
| 8,271,308 B2 | 9/2012 | Winkler | |
| 8,271,321 B1 | 9/2012 | Kestenbaum | |
| 8,289,160 B1 | 10/2012 | Billman | |
| 8,290,753 B2* | 10/2012 | Tryon, III | G06F 11/008 703/2 |
| 8,294,567 B1 | 10/2012 | Stell | |
| 8,306,258 B2 | 11/2012 | Brown | |
| 8,323,189 B2* | 12/2012 | Tran | A61B 5/1112 600/300 |
| 8,332,242 B1 | 12/2012 | Medina, III | |
| 8,332,348 B1 | 12/2012 | Avery | |
| 8,384,538 B2 | 2/2013 | Breed | |
| 8,400,299 B1 | 3/2013 | Maroney et al. | |
| 8,428,972 B1 | 4/2013 | Noles et al. | |
| 8,452,678 B2 | 5/2013 | Feldman et al. | |
| 8,510,196 B1 | 8/2013 | Brandmaier et al. | |
| 8,515,788 B2 | 8/2013 | Tracy et al. | |
| 8,521,542 B1 | 8/2013 | Stotts | |
| 8,527,306 B1 | 9/2013 | Reeser et al. | |
| 8,600,104 B2 | 12/2013 | Brown | |
| 8,635,091 B2 | 1/2014 | Amigo et al. | |
| 8,638,228 B2 | 1/2014 | Amigo et al. | |
| 8,650,048 B1 | 2/2014 | Hopkins, III et al. | |
| 8,676,612 B2 | 3/2014 | Helitzer et al. | |
| 8,719,061 B2 | 5/2014 | Birchall | |

(56) References Cited

U.S. PATENT DOCUMENTS

| | | | |
|---|---|---|---|
| 8,731,975 B2 * | 5/2014 | English | H04L 61/5007 |
| | | | 705/40 |
| 8,760,285 B2 | 6/2014 | Billman et al. | |
| 8,774,525 B2 | 7/2014 | Pershing | |
| 8,782,395 B1 | 7/2014 | Ly | |
| 8,788,299 B1 | 7/2014 | Medina, III | |
| 8,788,301 B1 | 7/2014 | Marlow et al. | |
| 8,799,034 B1 | 8/2014 | Brandmaier et al. | |
| 8,812,414 B2 | 8/2014 | Arthur et al. | |
| 8,813,065 B2 | 8/2014 | Zygmuntowicz et al. | |
| 8,850,263 B1 | 9/2014 | Yourtee et al. | |
| 8,868,541 B2 | 10/2014 | Lin et al. | |
| 8,872,818 B2 | 10/2014 | Freeman et al. | |
| 8,910,298 B2 * | 12/2014 | Gettings | G08B 23/00 |
| | | | 726/26 |
| 8,924,241 B2 | 12/2014 | Grosso | |
| 8,930,581 B2 | 1/2015 | Anton et al. | |
| 8,947,230 B1 * | 2/2015 | Gettings | G08B 3/10 |
| | | | 340/508 |
| 9,015,238 B1 | 4/2015 | Anton et al. | |
| 9,049,168 B2 | 6/2015 | Jacob et al. | |
| 9,053,516 B2 | 6/2015 | Stempora | |
| 9,082,015 B2 | 7/2015 | Christopulos et al. | |
| 9,141,995 B1 | 9/2015 | Brinkmann et al. | |
| 9,158,869 B2 | 10/2015 | Labrie et al. | |
| 9,165,084 B2 | 10/2015 | Isberg et al. | |
| 9,183,560 B2 | 11/2015 | Abelow | |
| 9,252,980 B2 | 2/2016 | Raman | |
| 9,311,676 B2 | 4/2016 | Helitzer et al. | |
| 9,330,550 B2 | 5/2016 | Zribi et al. | |
| 9,363,322 B1 | 6/2016 | Anton et al. | |
| 9,454,907 B2 | 9/2016 | Hafeez et al. | |
| 9,460,471 B2 | 10/2016 | Bernard et al. | |
| 9,481,459 B2 | 11/2016 | Staskevich et al. | |
| 9,519,393 B2 | 12/2016 | Grossele et al. | |
| 9,611,038 B2 | 4/2017 | Dahlstrom | |
| 9,613,523 B2 | 4/2017 | Davidson et al. | |
| 9,652,805 B1 | 5/2017 | Clawson, II et al. | |
| 9,665,074 B2 | 5/2017 | Lentzitzky | |
| 9,710,858 B1 | 7/2017 | Devereaux et al. | |
| 9,721,086 B2 * | 8/2017 | Shear | G06F 21/6218 |
| 9,747,571 B2 | 8/2017 | Ballew et al. | |
| 9,754,325 B1 | 9/2017 | Konrardy et al. | |
| 9,792,656 B1 | 10/2017 | Konrardy et al. | |
| 9,811,862 B1 | 11/2017 | Allen et al. | |
| 9,818,158 B1 | 11/2017 | Devereaux et al. | |
| 9,842,310 B2 | 12/2017 | Lekas | |
| 9,886,723 B1 | 2/2018 | Devereaux et al. | |
| 9,892,463 B1 | 2/2018 | Hakimi-Boushehri et al. | |
| 9,913,003 B2 | 3/2018 | Lloyd et al. | |
| 9,934,675 B2 | 4/2018 | Coyne et al. | |
| 9,947,051 B1 | 4/2018 | Allen et al. | |
| 9,959,581 B2 | 5/2018 | Pershing | |
| 9,984,417 B1 | 5/2018 | Allen et al. | |
| 10,032,224 B2 | 7/2018 | Helitzer et al. | |
| 10,055,793 B1 | 8/2018 | Call et al. | |
| 10,055,794 B1 | 8/2018 | Konrardy et al. | |
| 10,121,207 B1 | 11/2018 | Devereaux et al. | |
| 10,163,162 B1 | 12/2018 | Devereaux et al. | |
| 10,181,159 B1 | 1/2019 | Allen et al. | |
| 10,212,495 B2 | 2/2019 | Lloyd et al. | |
| 10,387,961 B1 * | 8/2019 | Burgess | G06Q 40/08 |
| 2002/0007289 A1 | 1/2002 | Malin et al. | |
| 2002/0021465 A1 * | 2/2002 | Moore, Jr. | H04N 7/22 |
| | | | 398/72 |
| 2002/0032586 A1 | 3/2002 | Joao | |
| 2002/0035528 A1 | 3/2002 | Simpson et al. | |
| 2002/0049618 A1 | 4/2002 | McClure et al. | |
| 2002/0055861 A1 | 5/2002 | King et al. | |
| 2002/0087364 A1 | 7/2002 | Lerner et al. | |
| 2002/0103622 A1 | 8/2002 | Burge | |
| 2002/0111835 A1 | 8/2002 | Hele et al. | |
| 2002/0116254 A1 | 8/2002 | Stein et al. | |
| 2002/0129001 A1 | 9/2002 | Levkoff et al. | |
| 2002/0178033 A1 | 11/2002 | Yoshioka et al. | |
| 2002/0183866 A1 | 12/2002 | Dean et al. | |
| 2003/0040934 A1 | 2/2003 | Skidmore et al. | |
| 2003/0078816 A1 | 4/2003 | Filep | |
| 2003/0097335 A1 | 5/2003 | Moskowitz et al. | |
| 2003/0156034 A1 * | 8/2003 | Longobardi | F25D 29/008 |
| | | | 340/585 |
| 2003/0182441 A1 | 9/2003 | Andrew et al. | |
| 2004/0019507 A1 | 1/2004 | Yaruss et al. | |
| 2004/0034657 A1 | 2/2004 | Zambo et al. | |
| 2004/0039586 A1 | 2/2004 | Garvey et al. | |
| 2004/0046033 A1 | 3/2004 | Kolodziej et al. | |
| 2004/0064345 A1 | 4/2004 | Ajamian et al. | |
| 2004/0122560 A1 | 6/2004 | Hart | |
| 2004/0172304 A1 | 9/2004 | Joao | |
| 2004/0181621 A1 | 9/2004 | Mathur et al. | |
| 2004/0260406 A1 | 12/2004 | Ljunggren et al. | |
| 2005/0033694 A1 * | 2/2005 | Perrin | G06Q 20/04 |
| | | | 705/44 |
| 2005/0050017 A1 | 3/2005 | Ross et al. | |
| 2005/0055248 A1 | 3/2005 | Helitzer et al. | |
| 2005/0055249 A1 | 3/2005 | Helitzer et al. | |
| 2005/0057365 A1 | 3/2005 | Qualey | |
| 2005/0128074 A1 | 6/2005 | Culpepper et al. | |
| 2005/0197847 A1 | 9/2005 | Smith | |
| 2005/0226273 A1 | 10/2005 | Qian | |
| 2005/0251427 A1 | 11/2005 | Dorai et al. | |
| 2005/0278082 A1 | 12/2005 | Weekes | |
| 2006/0017558 A1 | 1/2006 | Albert et al. | |
| 2006/0026044 A1 | 2/2006 | Smith | |
| 2006/0052905 A1 | 3/2006 | Pfingsten et al. | |
| 2006/0101508 A1 * | 5/2006 | Taylor | G07C 9/37 |
| | | | 340/5.82 |
| 2006/0111874 A1 | 5/2006 | Curtis et al. | |
| 2006/0200008 A1 | 9/2006 | Moore-Ede | |
| 2006/0218018 A1 | 9/2006 | Schmitt | |
| 2006/0219705 A1 | 10/2006 | Beier et al. | |
| 2006/0229923 A1 | 10/2006 | Adi et al. | |
| 2006/0235611 A1 | 10/2006 | Deaton et al. | |
| 2006/0287902 A1 * | 12/2006 | Helsper | G06Q 40/02 |
| | | | 235/382 |
| 2007/0005400 A1 | 1/2007 | Eggenberger et al. | |
| 2007/0005404 A1 | 1/2007 | Raz et al. | |
| 2007/0043803 A1 | 2/2007 | Whitehouse et al. | |
| 2007/0088507 A1 | 4/2007 | Haberlen et al. | |
| 2007/0088579 A1 | 4/2007 | Richards | |
| 2007/0100669 A1 | 5/2007 | Wargin et al. | |
| 2007/0118399 A1 | 5/2007 | Avinash et al. | |
| 2007/0136078 A1 | 6/2007 | Plante | |
| 2007/0150319 A1 | 6/2007 | Menendez | |
| 2007/0156463 A1 | 7/2007 | Burton et al. | |
| 2007/0161940 A1 | 7/2007 | Blanchard et al. | |
| 2007/0174467 A1 | 7/2007 | Ballou et al. | |
| 2007/0214023 A1 | 9/2007 | Mathai et al. | |
| 2007/0282639 A1 | 12/2007 | Leszuk et al. | |
| 2007/0299677 A1 | 12/2007 | Maertz | |
| 2008/0015827 A1 * | 1/2008 | Tryon, III | G06F 11/008 |
| | | | 703/2 |
| 2008/0033847 A1 | 2/2008 | McIntosh | |
| 2008/0046334 A1 * | 2/2008 | Lee | G06Q 30/0185 |
| | | | 705/318 |
| 2008/0052134 A1 | 2/2008 | Nowak et al. | |
| 2008/0065427 A1 | 3/2008 | Helitzer et al. | |
| 2008/0077451 A1 | 3/2008 | Anthony et al. | |
| 2008/0086320 A1 | 4/2008 | Ballew et al. | |
| 2008/0087147 A1 * | 4/2008 | Sussmeier | B26D 1/085 |
| | | | 83/13 |
| 2008/0098466 A1 * | 4/2008 | Yoshida | G06F 21/43 |
| | | | 726/5 |
| 2008/0105134 A1 * | 5/2008 | Elston III | G06Q 10/06 |
| | | | 99/325 |
| 2008/0114655 A1 | 5/2008 | Skidmore | |
| 2008/0140576 A1 * | 6/2008 | Lewis | G06Q 30/02 |
| | | | 707/999.107 |
| 2008/0140857 A1 | 6/2008 | Conner et al. | |
| 2008/0154651 A1 | 6/2008 | Kenefick et al. | |
| 2008/0154686 A1 | 6/2008 | Vicino | |
| 2008/0154851 A1 | 6/2008 | Jean | |
| 2008/0154886 A1 | 6/2008 | Podowski et al. | |

(56) References Cited

U.S. PATENT DOCUMENTS

| | | |
|---|---|---|
| 2008/0164769 A1 | 7/2008 | Eck |
| 2008/0243558 A1 | 10/2008 | Gupte |
| 2008/0244329 A1 | 10/2008 | Shinbo et al. |
| 2008/0282817 A1 | 11/2008 | Breed |
| 2008/0287121 A1* | 11/2008 | Ebrom ............... H04L 12/2823 709/201 |
| 2008/0306799 A1 | 12/2008 | Sopko et al. |
| 2008/0307104 A1 | 12/2008 | Amini et al. |
| 2008/0319787 A1 | 12/2008 | Stivoric et al. |
| 2009/0006175 A1 | 1/2009 | Maertz |
| 2009/0024420 A1 | 1/2009 | Winkler |
| 2009/0031175 A1 | 1/2009 | Aggarwal et al. |
| 2009/0045803 A1 | 2/2009 | Schoettle |
| 2009/0109037 A1 | 4/2009 | Farmer |
| 2009/0119132 A1 | 5/2009 | Bolano et al. |
| 2009/0135009 A1 | 5/2009 | Little et al. |
| 2009/0177500 A1 | 7/2009 | Swahn |
| 2009/0188202 A1 | 7/2009 | Vokey |
| 2009/0205054 A1 | 8/2009 | Blotenberg et al. |
| 2009/0216349 A1 | 8/2009 | Kwon et al. |
| 2009/0240531 A1 | 9/2009 | Hilborn |
| 2009/0240550 A1 | 9/2009 | McCarty |
| 2009/0265193 A1 | 10/2009 | Collins et al. |
| 2009/0265207 A1 | 10/2009 | Johnson |
| 2009/0266565 A1 | 10/2009 | Char |
| 2009/0279734 A1 | 11/2009 | Brown |
| 2009/0287509 A1 | 11/2009 | Basak et al. |
| 2010/0030586 A1 | 2/2010 | Taylor et al. |
| 2010/0049552 A1 | 2/2010 | Fini et al. |
| 2010/0131300 A1 | 5/2010 | Collopy et al. |
| 2010/0131307 A1 | 5/2010 | Collopy et al. |
| 2010/0174566 A1 | 7/2010 | Helitzer et al. |
| 2010/0228580 A1* | 9/2010 | Zoldi .................. G06Q 40/12 707/E17.014 |
| 2010/0229225 A1* | 9/2010 | Sarmah ............... H04L 9/3213 455/466 |
| 2010/0241464 A1 | 9/2010 | Amigo et al. |
| 2010/0274366 A1 | 10/2010 | Fata et al. |
| 2010/0274590 A1 | 10/2010 | Compangano et al. |
| 2010/0274859 A1 | 10/2010 | Bucuk |
| 2010/0286937 A1 | 11/2010 | Hedley et al. |
| 2010/0299161 A1 | 11/2010 | Burdick et al. |
| 2010/0299162 A1 | 11/2010 | Kwan |
| 2011/0043958 A1 | 2/2011 | Nakamura et al. |
| 2011/0061697 A1 | 3/2011 | Behrenbruch et al. |
| 2011/0112848 A1 | 5/2011 | Beraja et al. |
| 2011/0137684 A1 | 6/2011 | Peak et al. |
| 2011/0137685 A1 | 6/2011 | Tracy et al. |
| 2011/0137885 A1 | 6/2011 | Isberg et al. |
| 2011/0161117 A1 | 6/2011 | Busque et al. |
| 2011/0161119 A1 | 6/2011 | Collins |
| 2011/0295624 A1 | 12/2011 | Chapin et al. |
| 2011/0320226 A1 | 12/2011 | Graziano et al. |
| 2012/0004935 A1 | 1/2012 | Winkler |
| 2012/0016695 A1 | 1/2012 | Bernard et al. |
| 2012/0022897 A1 | 1/2012 | Shafer |
| 2012/0025994 A1 | 2/2012 | Morris |
| 2012/0028635 A1 | 2/2012 | Borg et al. |
| 2012/0028835 A1 | 2/2012 | Wild et al. |
| 2012/0046975 A1 | 2/2012 | Stolze |
| 2012/0072240 A1 | 3/2012 | Grosso et al. |
| 2012/0096149 A1 | 4/2012 | Sunkara et al. |
| 2012/0101855 A1 | 4/2012 | Collins et al. |
| 2012/0116820 A1 | 5/2012 | English et al. |
| 2012/0130751 A1 | 5/2012 | McHugh et al. |
| 2012/0143634 A1 | 6/2012 | Beyda et al. |
| 2012/0158436 A1 | 6/2012 | Bauer et al. |
| 2012/0176237 A1 | 7/2012 | Tabe |
| 2012/0190386 A1* | 7/2012 | Anderson ............. G01S 19/14 455/456.3 |
| 2012/0215568 A1 | 8/2012 | Vahidi et al. |
| 2012/0290333 A1 | 11/2012 | Birchall |
| 2012/0311053 A1 | 12/2012 | Labrie et al. |
| 2012/0311614 A1 | 12/2012 | DeAnna et al. |
| 2012/0323609 A1 | 12/2012 | Fini |
| 2013/0006608 A1 | 1/2013 | Dehors et al. |
| 2013/0018936 A1 | 1/2013 | DAmico et al. |
| 2013/0040636 A1 | 2/2013 | Borg et al. |
| 2013/0040836 A1 | 2/2013 | Himmler et al. |
| 2013/0055060 A1 | 2/2013 | Folsom et al. |
| 2013/0060583 A1 | 3/2013 | Collins et al. |
| 2013/0073303 A1 | 3/2013 | Hsu |
| 2013/0144658 A1* | 6/2013 | Schnabolk ........... G06Q 50/163 705/4 |
| 2013/0144858 A1 | 6/2013 | Lin et al. |
| 2013/0182002 A1 | 7/2013 | Macciola et al. |
| 2013/0185716 A1 | 7/2013 | Yin et al. |
| 2013/0197945 A1 | 8/2013 | Anderson |
| 2013/0201018 A1 | 8/2013 | Horstemeyer et al. |
| 2013/0226623 A1 | 8/2013 | Diana et al. |
| 2013/0226624 A1 | 8/2013 | Blessman et al. |
| 2013/0245796 A1 | 9/2013 | Lentzitzky et al. |
| 2013/0253961 A1 | 9/2013 | Feldman et al. |
| 2013/0268358 A1 | 10/2013 | Haas |
| 2013/0282408 A1 | 10/2013 | Snyder et al. |
| 2013/0317732 A1 | 11/2013 | Borg et al. |
| 2014/0018969 A1 | 1/2014 | Forbes, Jr. |
| 2014/0040343 A1 | 2/2014 | Nickolov et al. |
| 2014/0046701 A1 | 2/2014 | Steinberg et al. |
| 2014/0050147 A1 | 2/2014 | Beale |
| 2014/0058761 A1 | 2/2014 | Freiberger et al. |
| 2014/0067137 A1 | 3/2014 | Amelio et al. |
| 2014/0081675 A1 | 3/2014 | Ives et al. |
| 2014/0089156 A1 | 3/2014 | Williams et al. |
| 2014/0089209 A1 | 3/2014 | Akcamete et al. |
| 2014/0089990 A1 | 3/2014 | van Deventer et al. |
| 2014/0108275 A1 | 4/2014 | Heptonstall |
| 2014/0114693 A1 | 4/2014 | Helitzer et al. |
| 2014/0114893 A1 | 4/2014 | Arthur et al. |
| 2014/0123292 A1 | 5/2014 | Schmidt et al. |
| 2014/0123309 A1 | 5/2014 | Jung et al. |
| 2014/0132409 A1 | 5/2014 | Billman et al. |
| 2014/0136242 A1 | 5/2014 | Weekes et al. |
| 2014/0142989 A1 | 5/2014 | Grosso |
| 2014/0149485 A1 | 5/2014 | Sharma et al. |
| 2014/0180723 A1 | 6/2014 | Cote et al. |
| 2014/0192646 A1 | 7/2014 | Mir et al. |
| 2014/0195272 A1 | 7/2014 | Sadiq et al. |
| 2014/0201072 A1 | 7/2014 | Reeser et al. |
| 2014/0201315 A1 | 7/2014 | Jacob et al. |
| 2014/0214458 A1 | 7/2014 | Vahidi et al. |
| 2014/0249876 A1 | 9/2014 | Wu et al. |
| 2014/0257862 A1 | 9/2014 | Billman et al. |
| 2014/0257863 A1 | 9/2014 | Maastricht et al. |
| 2014/0266287 A1 | 9/2014 | Reeder, III |
| 2014/0266669 A1 | 9/2014 | Fadell et al. |
| 2014/0266671 A1 | 9/2014 | Huynh et al. |
| 2014/0270492 A1 | 9/2014 | Christopulos et al. |
| 2014/0278573 A1 | 9/2014 | Cook |
| 2014/0279593 A1 | 9/2014 | Pershing |
| 2014/0280457 A1 | 9/2014 | Anton et al. |
| 2014/0304007 A1 | 10/2014 | Kimball et al. |
| 2014/0316614 A1 | 10/2014 | Newman |
| 2014/0316743 A1 | 10/2014 | Drees et al. |
| 2014/0322676 A1 | 10/2014 | Raman |
| 2014/0327995 A1 | 11/2014 | Panjwani et al. |
| 2014/0334492 A1 | 11/2014 | Mack-Crane |
| 2014/0358592 A1 | 12/2014 | Wedig et al. |
| 2014/0371941 A1 | 12/2014 | Keller et al. |
| 2014/0375440 A1 | 12/2014 | Rezvani et al. |
| 2014/0380264 A1 | 12/2014 | Misra et al. |
| 2015/0006206 A1 | 1/2015 | Mdeway |
| 2015/0019266 A1 | 1/2015 | Stempora |
| 2015/0025915 A1 | 1/2015 | Lekas |
| 2015/0025917 A1 | 1/2015 | Stempora |
| 2015/0026074 A1 | 1/2015 | Cotten |
| 2015/0112504 A1 | 4/2015 | Binion et al. |
| 2015/0154709 A1 | 6/2015 | Cook |
| 2015/0154712 A1 | 6/2015 | Cook |
| 2015/0161738 A1 | 6/2015 | Stempora |
| 2015/0221051 A1 | 8/2015 | Settino |
| 2015/0332407 A1 | 11/2015 | Wilson et al. |
| 2015/0339911 A1 | 11/2015 | Coyne et al. |
| 2015/0370272 A1 | 12/2015 | Reddy et al. |

(56) References Cited

U.S. PATENT DOCUMENTS

| | | | |
|---|---|---|---|
| 2015/0372832 A1 | 12/2015 | Kortz et al. | |
| 2016/0005130 A1 | 1/2016 | Devereaux et al. | |
| 2016/0039921 A1 | 2/2016 | Luo et al. | |
| 2016/0055594 A1 | 2/2016 | Emison | |
| 2016/0067547 A1 | 3/2016 | Anthony et al. | |
| 2016/0104250 A1 | 4/2016 | Allen et al. | |
| 2016/0125170 A1 | 5/2016 | Abramowitz | |
| 2016/0163186 A1* | 6/2016 | Davidson | G06Q 50/06 340/506 |
| 2016/0225098 A1 | 8/2016 | Helitzer et al. | |
| 2017/0178424 A1 | 6/2017 | Wright | |
| 2017/0365008 A1 | 12/2017 | Schreier et al. | |

FOREIGN PATENT DOCUMENTS

| | | |
|---|---|---|
| CA | 2518482 C | 3/2007 |
| CA | 2805226 A1 | 8/2013 |
| CA | 2882086 A1 | 2/2014 |
| CN | 103203054 B | 7/2013 |
| DE | 102005015028 B4 | 10/2006 |
| DE | 102008008317 A1 | 8/2009 |
| EP | 0722145 A1 | 7/1996 |
| EP | 1790057 B1 | 5/2012 |
| EP | 2795757 A4 | 10/2014 |
| EP | 2276135 B1 | 4/2015 |
| EP | 3255613 A1 | 12/2017 |
| GB | 2449510 A | 11/2008 |
| JP | 3282937 B2 | 5/2002 |
| JP | 2002358425 A | 12/2002 |
| JP | 2008250594 A | 10/2008 |
| KR | 20090090461 A | 8/2009 |
| MX | 337513 B | 8/2009 |
| RU | 2015109725 A | 10/2016 |
| WO | 2004034232 A2 | 4/2004 |
| WO | 2006074682 A2 | 7/2006 |
| WO | 2010136163 A1 | 12/2010 |
| WO | 2012075442 A1 | 6/2012 |
| WO | 2013036677 A1 | 3/2013 |

OTHER PUBLICATIONS

Beyond mobile: research topics for upcoming technologies in the insurance industry IEEE 2003 (Year: 2003).*

"Food Spoilage Claims Demystified: Rotten Stuff" Gordon Atlantic Insurance 2011 (Year: 2011).*

"The intelligent container as a part of the Internet of Things" IEEE (Year: 2012).*

"RFID enabled pricing approach in perishable food supply chains" IEEE (Year: 2010).*

"After an Auto Accident: Understanding the Claims Process," Financial Services Commission on Ontario, 2011, 10 pgs.

"Truck Crash Event Data Recorder Downloading," Crash Forensic; 2012, pp. 1-25.

Aiyagari, Sanjay et al., "AMQP Message Queuing Protocol Specification," Version Dec. 9, 2006. https://www.rabbitmq.com/resources/specs/amqp0-9.

Amanda Love, "How Recoverable Depreciation Works", Aug. 6, 2012, http://www.stateroofingtexas.com/recoverable-depreciation-works/.

AMQP is the Internet Protocol for Business Messaging Website. Jul. 4, 2011. https://web.archive.org/web/20110704212632/http://www.amqp.org/about/what.

Cloudera.com, "Migrating from MapReduce 1 (MRv1) to Map Reduce 2 (MRv2, YARN)", https://www.cloudera.com/documentation/enterprise/5-9-x/topics/cdh_ig_mapreduce_to_yarn_migrate.html, page generated Feb. 6, 2018.

Corbett et al., "Spanner: Google's Globally-Distributed Database," Google, Inc., pp. 1-14, 2012.

Das, Sudipto et al., "Ricardo: Integrating R and Hadoop," IBM Almaden Research Center, SIGMOD'10, Jun. 6-11, 2010.

Dean et al., "A New Age of Data Mining in the High-Performance World," SAS Institute Inc., 2012.

Deerwester et al., "Indexing by Latent Semantic Analysis," Journal of the American Society for Information Science, 1990.41 (6), pp. 391-407.

Farmers Next Generation Homeowners Policy, Missouri, by Farmers insurance Exchange; 2008; 50 pages.

Fong et al., "Toward a scale-out data-management middleware for low-latency enterprise computing," IBM J. Res & Dev. vol. 57, No. 3/4 Paper, 6 May/Jul. 2013.

Glennon, Jr., John C.; "Motor Vehicle Crash Investigation and Reconstruction," BSAT, 2001, 4 pgs.

Gonzalez Ribeiro, Ana, "Surprising things your home insurance covers," Jan. 12, 2012 in Insurance; 4 pages.

Hopkins, Brian, "Big Opportunities in Big Data Positioning Your Firm to Capitalize in a Sea of Information," Enterprise Architecture Professionals, Forrester Research, Inc., pp. 1-9, May 2011.

Iwasaki, Yoji; Yamazaki, Fumimo, Publication Info: 32nd Asian Conference on Remote Sensing 2011, ACRS 2011 1: 550-555. Asian Association on Remote Sensing. (Dec. 1, 2011) (Year: 2011).

Kopp et al., "Full-scale testing of low-rise, residential buildings with realistic wind loads", 2012, 15 pages.

McKeown et al., "OpenFlow: Enabling Innovation in Campus Networks," pp. 1-6, Mar. 14, 2008.

Melnik, Sergey et al., "Dremel: Interactive Analysis of Web-Scale Datasets," 36th International Conference on Very Large Data Bases, Sep. 13-17, 2010, Singapore, Proceedings of the VLDB Endowment, vol. No. 1.

NYSE Technologies Website and Fact Sheet for Data Fabric 6.0 Aug. 2011, https://web.archive.org/web/20110823124532/http://nysetechnologies.nyx.com/data-technology/data-fabric-6-0.

Richardson, Alexis, "Introduction to RabbitMQ, An Open Source Message Broker That Just Works," Rabbit MQ, Open Source Enterprise Messaging, pp. 1-36, May 13, 2009.

Stefan Theußl, "Applied High Performance Computing Using R," Diploma Thesis, Univ. Prof, Dipl, Ing. Dr. Kurt Hornik, pp. 1-126, Sep. 27, 2007.

STIC search dated Jan. 4, 2019 (Year 2019).

Telematics Set the Stage the Improved Auto Claims Management by Sam Friedman (Oct. 10, 2012); 3 pages.

Wang, Guohul et al., "Programming Your Network at Run-time for Big Data Applications," IBM T.J. Watson Research Center, Rice University, HotSDN'12, Aug. 13, 2012, Helsinki, Finland.

Wang, Jianwu et al., "Kepler + Hadoop: A General Architecture Facilitating Data-Intensive Applications in Scientific Workflow Systems," WORKS 09, Nov. 15, 2009, Portland, Oregon, USA.

Webb, Kevin C. et al., "Topology Switching for Data Center Networks," Published in: Proceeding Hot-ICE'11 Proceedings of the 11th USENIX conference on Hot topics in management of Internet, cloud, and enterprise networks and services, Mar. 29, 2011.

Xi et al., "Enabling Flow-Based Routing Control in Data Center Networks using Probe and ECMP," Polytechnic Institute of New York University, IEE INFOCOM 2011, pp. 614-619.

Zevnik, Richard. The Complete Book of Insurance. Sphinx. 2004. pp. 76-78.

* cited by examiner

DETERMINING APPLIANCE INSURANCE COVERAGE/PRODUCTS USING INFORMATIC SENSOR DATA

CROSS REFERENCE TO RELATED APPLICATIONS

This application is a continuation application of U.S. patent application Ser. No. 15/868,923, filed on Jan. 11, 2018, which claims priority to U.S. patent application Ser. No. 14/324,759, filed on Jul. 7, 2014, which in turn claims priority to U.S. Patent Application Ser. No. 61/926,093 filed Jan. 10, 2014; 61/926,091 filed Jan. 10, 2014; 61/926,095 filed Jan. 10, 2014; 61/926,098 filed Jan. 10, 2014; 61/926,103 filed Jan. 10, 2014; 61/926,108 filed Jan. 10, 2014; 61/926,111 filed Jan. 10, 2014; 61/926,114 filed Jan. 10, 2014; 61/926,118 filed Jan. 10, 2014; 61/926,119 filed Jan. 10, 2014; 61/926,121 filed Jan. 10, 2014; 61/926,123 filed Jan. 10, 2014; 61/926,536 filed Jan. 13, 2014; 61/926,541 filed Jan. 13, 2014; 61/926,534 filed Jan. 13, 2014; 61/926,532 filed Jan. 13, 2014; 61/943,897 filed Feb. 24, 2014; 61/943,901 filed Feb. 24, 2014; 61/943,906 filed Feb. 24, 2014; and 61/948,192 filed Mar. 5, 2014 which are each incorporated herein by reference in its entirety.

FIELD OF THE INVENTION

The disclosed embodiments generally relate to a method and computerized system for managing insurance and related products and services, and more particularly, to using data captured from an insured property for determining appliance insurance products.

BACKGROUND OF THE INVENTION

Smart house functionality is a maturing space, but the opportunity for insurance companies remains largely untapped. Thus, the terms of insurance policies, such as homeowner insurance policies, may not be reflective of the true nature of the risks being insured.

Accordingly, there is an unmet need for measuring information relating to an insured risk, such as a residence or structures located on the residence premises, and utilizing that information to make appropriate modifications to insurance policy terms, such as the deductible amount.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, described is a computer device and method for processing risk related data to determine one or more insurance products for appliances and other systems located in an insured property. Informatic data is received from one or more informatic sensor devices relating to one or more appliances and/or systems located in an insured property. Analysis is performed on the received informatic data to determine one or more insurance products to be recommended for at least one appliance and/or system located in the insured property. Notification is provided regarding determination of the one or more insurance products for the at least one appliance and/or system located in the insured property.

In another aspect, an insurance policy is received that is associated with the insured property, which is the analyzed to determine if the one or more appliances and/or system located in the insured property are covered by the insurance policy. Analysis is then performed on the received informatic data to determine one or more insurance products providing insurance coverage for one or more appliances and/or systems located in the insured property, which insurance coverage is determined not to be provided by the analyzed insurance policy.

This summary section is provided to introduce a selection of concepts in a simplified form that are further described subsequently in the detailed description section. This summary section is not intended to identify key features or essential features of the claimed subject matter, nor is it intended to be used to limit the scope of the claimed subject matter.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
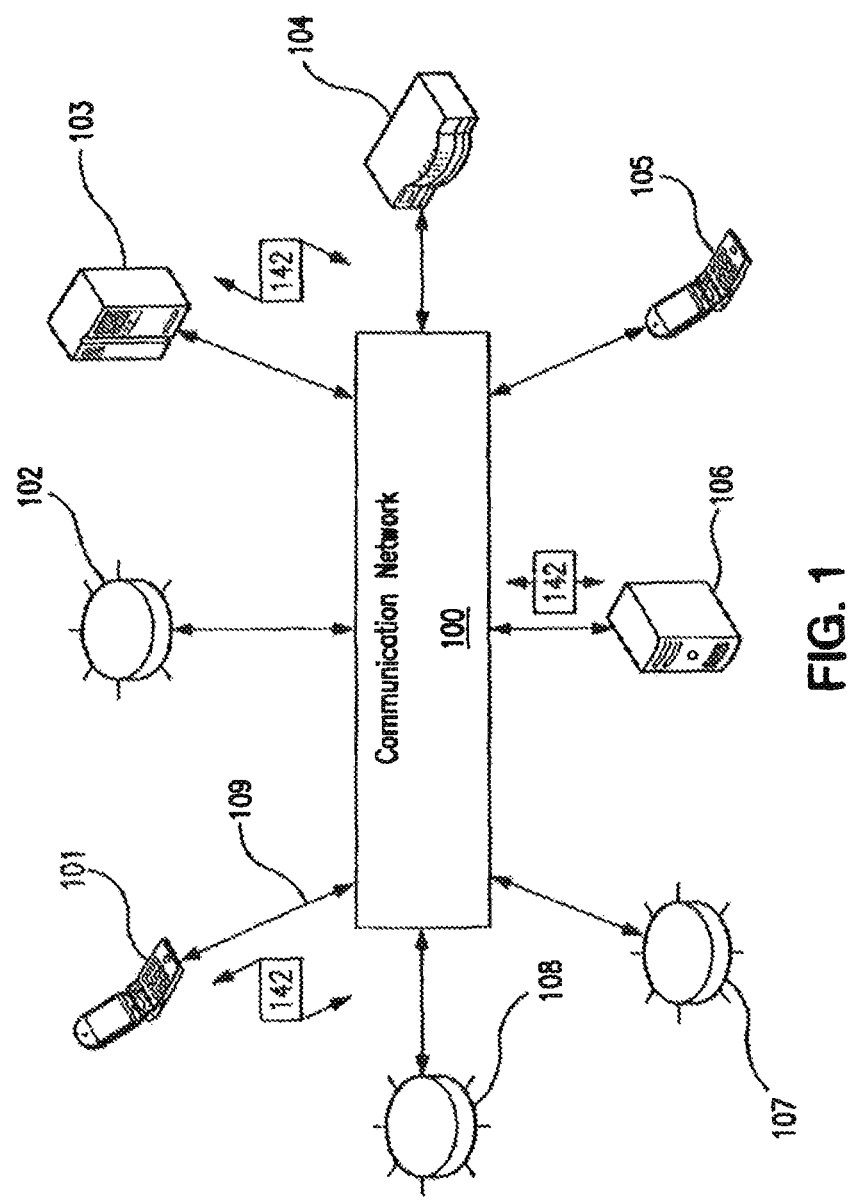
FIG. 1 illustrates an example communication network in accordance with an illustrated embodiment.

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the illustrated embodiments, exemplary methods and materials are now described. All publications mentioned herein are incorporated herein by reference to disclose and describe the methods and/or materials in connection with which the publications are cited.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below are preferably a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims. All publications and references cited herein are expressly incorporated herein by reference in their entirety. For instance, commonly assigned U.S. Pat. Nos. 8,289,160 and 8,400,299 are related to certain embodiments described here and are each incorporated herein by reference in their entirety.

As used herein, the term "insurance policy" refers to a contract between an insurer, also known as an insurance company, and an insured, also known as a policyholder, in which the insurer agrees to indemnify the insured for specified losses, costs, or damage on specified terms and conditions in exchange of a certain premium amount paid by the insured. In a typical situation, when the insured suffers some loss for which he/she may have insurance the insured makes an insurance claim to request payment for the loss. It is to be appreciated for the purpose of the embodiments illustrated herein, the insurance policy is not to be understood to be limited to a residential or homeowners insurance policy, but can be for a commercial, umbrella, and other insurance policies known by those skilled in the art.

As also used herein, "insured" may refer to an applicant for a new insurance policy and/or may refer to an insured under an existing insurance policy.

As used herein, the term "insurance policy" or "insurance product" may encompass a warranty or other contract for the repair, service, or maintenance of insured property.

As used herein, "insured property" means a dwelling, other buildings or structures, personal property, or business property, as well as the premises on which these are located, some or all which may be covered by an insurance policy.

Turning now descriptively to the drawings, in which similar reference characters denote similar elements throughout the several views, FIG. 1 depicts an exemplary communications network 100 in which below illustrated embodiments may be implemented.

It is to be understood a communication network 100 is a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a insured property 300 or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, servers 106, routers 107, switches 108 and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, cloud server, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
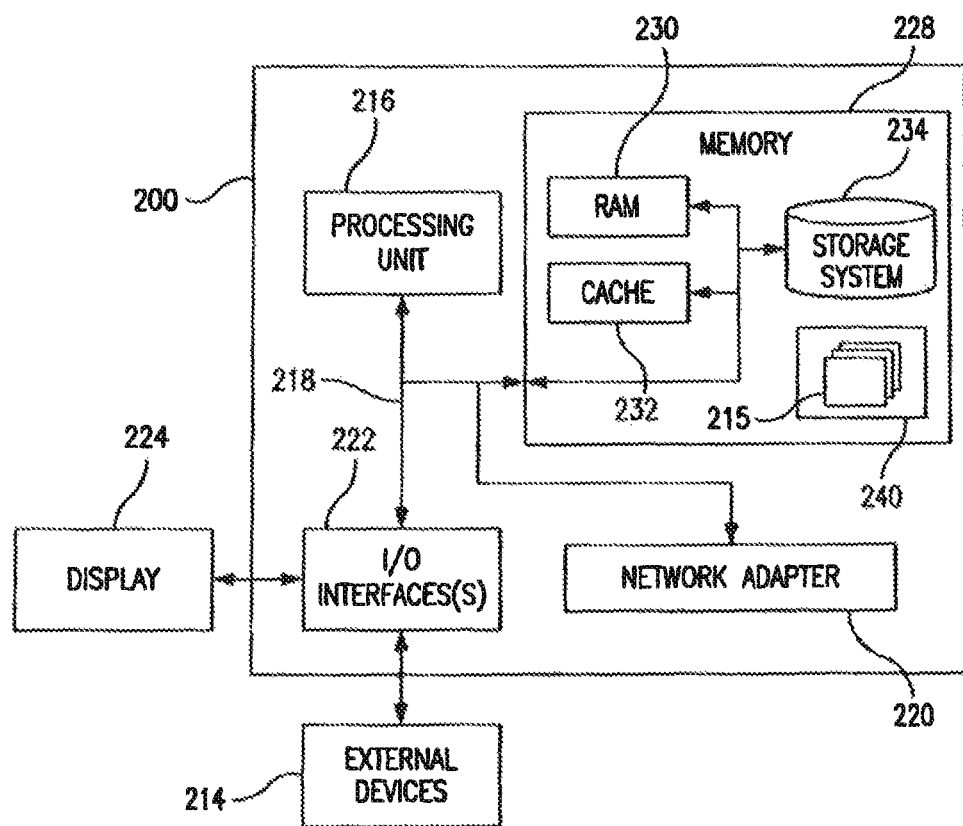
FIG. 2 illustrates a network computer device/node in accordance with an illustrated embodiment.

FIG. 2 is a schematic block diagram of an example network computing device 200 (e.g., one of network devices 101-108) that may be used (or components thereof) with one or more embodiments described herein, e.g., as one of the nodes shown in the network 100. As explained above, in different embodiments these various devices be configured to communicate with each other in any suitable way, such as, for example, via communication network 100.

Device 200 is only one example of a suitable system and is not intended to suggest any limitation as to the scope of use or functionality of embodiments of the invention described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 215, such as appliance analyzer module 308 described below, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of the invention as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, cloud servers, etc.

FIGS. 1 and 2 are intended to provide a brief, general description of an illustrative and/or suitable exemplary environment in which embodiments of the below described present invention may be implemented. FIGS. 1 and 2 are exemplary of a suitable environment and are not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
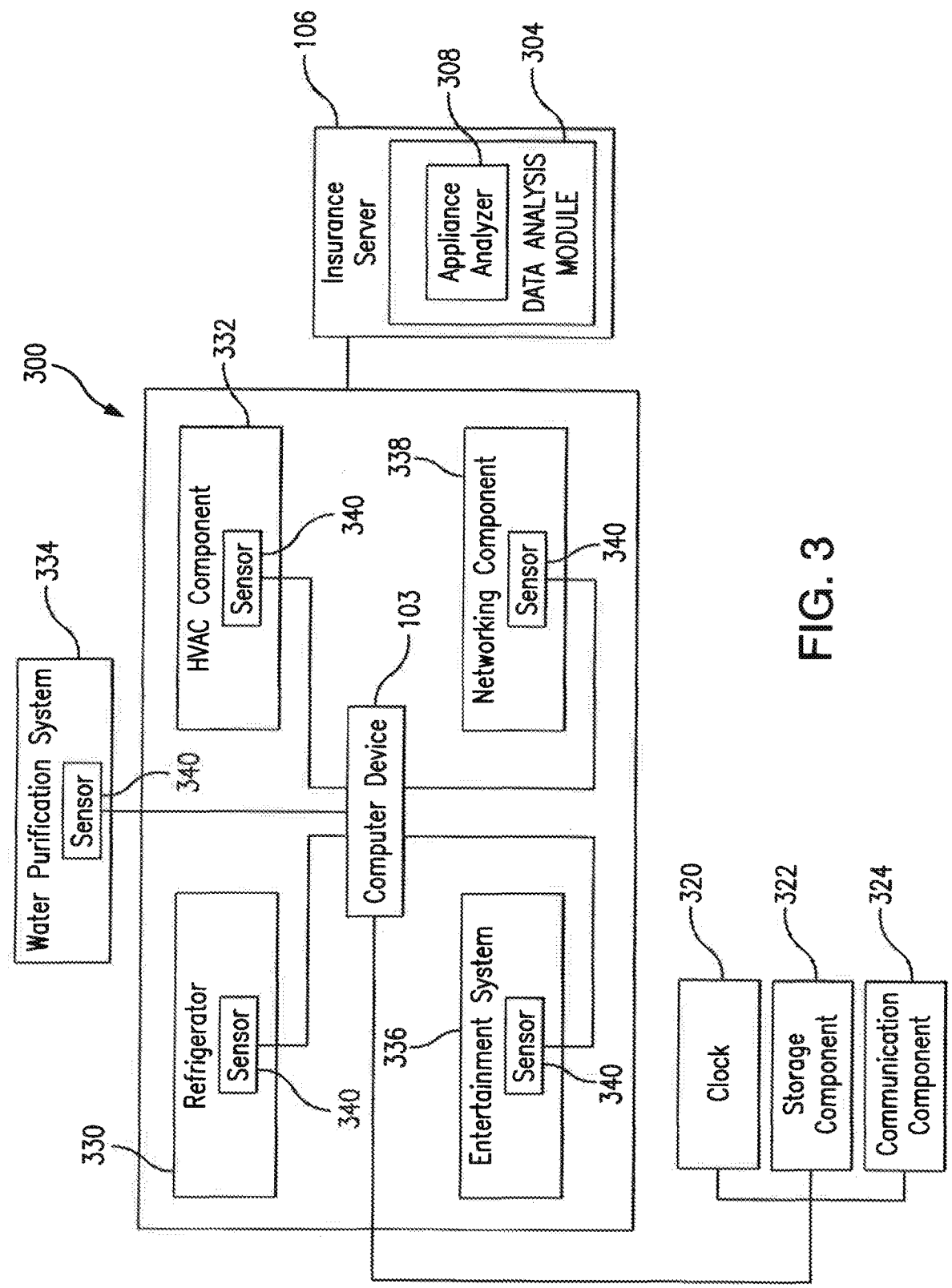
FIG. 3 is a block diagram of a plurality of appliances located inside or in the vicinity of an insured property from which sensor data is captured for subsequent analysis in accordance with an illustrated embodiment.

With the exemplary communication network 100 (FIG. 1) and computing device 200 (FIG. 2) being generally shown and discussed above, description of certain illustrated embodiments of the present invention will now be provided. With reference now to FIG. 3, an example of an insured property 300 is shown which is to be understood to be any type of insured property structure (e.g., residential, commercial, retail, municipal, etc.) in which the capture and analysis of sensor data is useful for the reasons at least described below.

Insured property 300 may contain one or more appliances located therein or in its vicinity. FIG. 3 is a block diagram illustrating such exemplary appliances from which sensor data is captured for subsequent analysis, in accordance with an illustrated embodiment. Insured property 300 preferably includes a computing device 103 (or centralized virtual private server) for capturing data from a plurality of sensors 340. It is to be understood computing device 103 may be located in any location, and its position is not limited to the example shown. Examples of appliances depicted in FIG. 3 include (but are not limited to) all kitchen appliances (e.g., refrigerator 330, freezer, stove, cooktop, oven, grill, dishwasher, etc.); HVAC components 332 (air conditioner, heating system, air handlers, humidifiers/de-humidifiers, etc.), water purification system 334, media entertainment system 336 (e.g., televisions), networking components 338 (routers, switches, extenders, etc.), electrical generator system, and the like. In many of the embodiments, appliances 330-338 have a computer based architecture or a controller that enables communication of data concerning the electronic appliance. It is to be understood insured property appliances 330-338 may be located in any location inside or outside of insured property 300, and their positions are not limited to the example depicted in FIG. 3. In addition, a plurality of appliance sensors 340 may be attached to and/or operatively connected to controllers or centralized hub (and/or other components and/or portions) of appliances 330-338.

Each of the appliance sensors 340 may be configured and operational to preferably detect various operating parameters relating to appliances 330-338 within or outside the insured property 300. An appliance sensor may comprise detection hardware, or may employ one or more remote probes, which may be located inside and/or outside the insured property 300, functional to detect certain operating parameters of appliances 330-338. Operating parameters detected by an appliance sensor 340 may include (but are not limited to): the operating efficiency of an appliance (energy usage, output performance); the time an appliance operates, the age of an appliance. Such appliance readings from one or more appliances 330-338 could thus be recorded by device 103 and used by an appliance analyzer 308 in various ways. It is additionally to be understood and appreciated that appliance sensors 340 can also be networked into a central computer hub (e.g., device 103) in an insured property or elsewhere to aggregate collected sensor data packets. Computing device 103 may communicate its data to server 106.

Computing device 103 is preferably configured and operational to receive (capture) data from various appliance sensors 340 regarding certain aspects (including functional and operational) of appliances 330-338 and transmit that captured data to a remote server 106, via network 100. It is noted device 103 may perform analytics regarding the captured sensor data regarding insured property 330-338 and/or the remote server 106, preferably located or controlled by an insurance company/carrier, may perform such analytics, as also further described below. It is also to be understood in other embodiments, data from appliance sensors 340 may be transmitted directly to remote server 106, via network 100, thus either obviating the need for computing device 103 or mitigating its functionality to capture all data from appliance sensors 340.

In the illustrated embodiment of FIG. 3, computing device 103 may be coupled to various below described sensor types operative to sense one or more ambient conditions relevant to the functionality of the plurality of appliances 330-338. It is to be understood and appreciated, in accordance with the embodiments herein, appliance sensors are preferably installed, and its data is collected, maintained, accessed and otherwise utilized pursuant to the permission of the insured(s) and subject to appropriate security and privacy protections.

Although various sensor types are described below, the sensor types described herein are not intended to be exhaustive as embodiments of the present invention may encompass any type of known or unknown sensor type which facilitates the purposes and objectives of the certain illustrated embodiments described herein. Exemplary sensor types include (but are not limited to):

Temperature sensor—configured and operational to preferably detect the temperature present at the insured property 300. For example, the temperature may rise and fall with the change of seasons and/or the time of day. Moreover, in the event of a fire, the temperature present at the insured property 300 may rise quickly—possibly to a level of extreme high heat. The temperature sensor may make use of probes placed at various locations in and around the insured property 300, in order to collect a representative profile of the temperature present at the insured property 300. These probes may be connected to device 103 by wire, or by a wireless technology. For example, if device 103 is positioned in the attic of the insured property 300, the temperature may be higher than the general temperature present in the insured property. Thus, probes placed at various locations (e.g., in the basement, on the various levels of a multi-level insured property 300, in different rooms that receive different amounts of sun, etc.), in order to obtain an accurate picture of the temperature present at the insured property. Moreover, device 103 may record both the indoor and outdoor temperature present at the insured property 300. For example, data about the indoor temperature, the outdoor temperature, and/or the differential between indoor and outdoor temperatures, may be used as part of some analysis model, and thus all of the different values could be stored. Device 103 may store an abstract representation of temperature (e.g., the average indoor temperature, as collected at all of the probes), or may store each temperature reading individually so that the individual readings may be provided as input to an analysis model.

Humidity sensor—configured and operational to preferably detect the humidity present at the insured property 300. Humidity sensor may comprise the humidity-detection hardware, or may employ one or more remote probes, which may be located inside and/or outside the insured property 300. Humidity readings from one or more locations inside and/or outside the insured property could thus be recorded by device 103.

Water pressure sensor—configured and operational to preferably monitor water pressure in the plumbing system in the insured property 300. Water pressure sensor may have one or more probes attached to various locations of the insured property's 300 plumbing, and thus device 103 may record the pressure present in the plumbing, and/or any changes in that pressure. For example, plumbing systems may be designed to withstand a certain amount of pressure, and if the pressure rises above that amount, the plumbing system may be at risk for leaking, bursting, or other failure. Thus, device 103 may record the water pressure that is present in the plumbing system at various points in time.

Water flow sensor—configured and operational to preferably monitor water flow rate in the plumbing system in the insured property 300. Water flow sensor may have one or more probes attached to various locations of the insured property's 300 plumbing, such as faucets, showerheads and appliances, and thus water flow sensor 103 may measure and/or record the amount of water flowing through the insured property's 300 water supply system. Thus, device 103 may record the water flow that is present in the plumbing system at various points in time.

Electrical system sensor/analyzer configured and operational to assess the condition of the insured property's 300 electrical system. For example, potentiometers may be connected to various points in the insured property's 300 electrical system to measure voltage. Readings from the potentiometers could be used to determine if the voltage is persistently too high, or too low, or if the voltage frequently drops and/or spikes. Such conditions may suggest that the insured property 300 is at risk for fire. Other types of electrical measurements could be taken, such as readings of current flowing through the electrical system. Still other types of electrical measurements could be determined include how energy is used and at what times of day it is used, etc. Any type of data about the insured property's 300 electrical system could be captured by device 103. An analysis model could use the information about electrical energy in various ways.

With exemplary sensors identified and briefly described above, and as will be further discussed below, it is to be generally understood sensors, including appliance sensors 340, preferably record certain data parameters relating to products and services provided by an insurance carrier, such as USAA, to identify and recommend appliance insurance products and other value added services such as those described below. It is to be understood and appreciated the aforementioned appliance sensors 340 may be configured as wired and wireless types integrated in a networked environment (e.g., WAN, LAN, WiFi, 802.11X, 3G, LTE, etc.), which may also have an associated IP address. It is to be further appreciated the appliance sensors 340 may consist of internal sensors located within the structure of insured property 300; external sensors located external of the structure of insured property 300; sound sensors for detecting ambient noise (e.g., for detecting termite and rodent activity, glass breakage, intruders, etc.); camera sensors such as those consisting of camera standalone devices, or by integrating into existing camera devices in an insured property 300. It is additionally to be understood and appreciated that appliance sensors 340 can be networked into a central computer hub (e.g., device 103) in an insured property or elsewhere to aggregate collected sensor data packets. Aggregated data packets can be analyzed in either a computer system (e.g., device 103) or via an external computer environment (e.g., server 106). Additionally, it is to be understood data packets collected from appliance sensors 340 can be aggregated in computing device 103 and sent as an aggregated packet to server 106 for subsequent analysis whereby data packets may be transmitted at prescribed time intervals (e.g., a benefit is to reduce cellular charges in that some insured properties 300 may not have Internet access or cellular service is backup when Internet service is nonfunctioning).

In accordance with an illustrated embodiment, in addition to the aforementioned, the appliance sensors 340 being utilized relative to insured property 300, computing device 103 may additionally be coupled to a Clock 320 which may keep track of time for device 103, thereby allowing a given item of data to be associated with the time at which the data was captured. For example, device 103 may recurrently capture readings of temperature, humidity, appliance operating times, etc., and may timestamp each reading. The time at which the readings are taken may be used to reconstruct events or for other analytic purposes, such as those described below.

A storage component 322 may further be provided and utilized to store data readings and/or timestamps in device 103. For example, storage component 322 may comprise, or may otherwise make use of, magnetic or optical disks, volatile random-access memory, non-volatile random-access memory, cloud servers, or any other type of storage device. There may be sufficient data storage capacity to store several hours or several days worth of readings.

A communication component 324 may further be provided and utilized to communicate recorded information from computing device 103 to an external location, such as computer server 106, which may be associated with an insurance carrier such as USAA. Communication component 324 may be, or may comprise, a network communication card such as an Ethernet card, a WiFi card, or any other communication mechanism. However, communication component 324 could take any form and is not limited to these examples. Communication component 324 might encrypt data that it communicates, in order to protect the security and/or privacy of the data. Communication component 324 may communicate data recorded by device 103 (e.g., data stored in storage component 322) to an external location, such as server 106. For example, server 106 may be operated by an insurance company, and may collect data from computing device 103 to learn about operating conditions, risks, maintenance and repair needs and other analytics relative to appliances 330-338 located in insured property 300. Communication component 324 may initiate communication sessions with server 106. Or, as another example, server 106 may contact device 103, through communication component 324, in order to receive data that has been stored by device 103. Additionally, data from appliance sensors 340, clock 320 and/or storage component 322 may be communicated directly to server 106, via network 100, thus obviating or mitigating the need for computing device 103.

In the example of FIG. 3, communication component 324 (which is shown, in FIG. 3, as being part of, or used by, computing device 103) communicates data to server 106. Server 106 may comprise, or otherwise may cooperate with, a data analysis module 304, which may analyze data in some manner. Data analysis module 304 may comprise various types of sub-modules, such as appliance analyzer 308. In general, appliance analyzer 308 may perform an analysis of collected data regarding various appliances located in or around insured property 300, such as their age, operating parameters, maintenance/repair issues, and the like.

Figure 4:
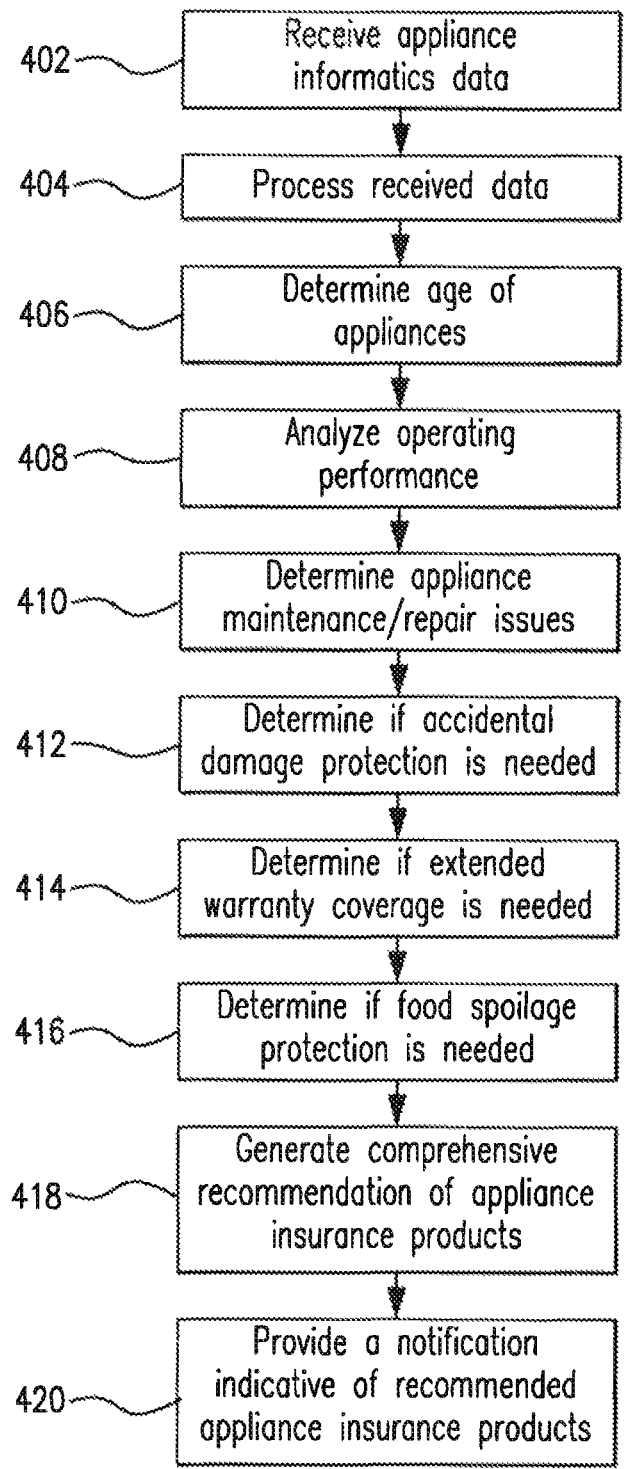
FIG. 4 is a flow diagram of operational steps of the appliance analyzer module of FIG. 3 in accordance with an illustrated embodiment.

FIG. 4 shows, in the form of a flow chart, exemplary operational steps of the appliance analyzer 308. Before turning to description of FIG. 4, it is noted that the flow diagram shown therein is described, by way of example, with reference to components shown in FIGS. 1-3, although these operational steps may be carried out in any system and are not limited to the scenario shown in the aforementioned figures. Additionally, the flow diagram in FIG. 4 shows an example in which operational steps are carried out in a particular order, as indicated by the lines connecting the blocks, but the various steps shown in this diagram can be performed in any order, or in any combination or subcombination.

At 402, appliance analyzer 308 preferably collects data from a plurality of appliance sensors 340 (shown in FIG. 3). Contact between the computing device 103 and appliance analyzer 308 may be initiated by either the appliance analyzer 308 or computing device 103. Following the initial contact, appliance analyzer 308 may receive data from the computing device 103. It is to be understood data packets collected from appliance sensors 340 can be aggregated in computing device 103 and sent as an aggregated packet to appliance analyzer 308 for subsequent analysis.

At 404, appliance analyzer 308 preferably processes the received data. For example, appliance analyzer 308 may include a parser configured to parse the aggregated packet and classify the received data based on, for example, type of appliance corresponding to a particular subset of the received data. Appliance analyzer 308 may create a data structure for each classification. This step may further involve identifying a policy holder associated with insured property 300 in which the analyzed appliances are located.

At 406, appliance analyzer 308 preferably determines the age of the appliances 330-338 or parts thereof and/or length of service of the appliances 330-338 based on data captured from sensors 340. At 408, appliance analyzer 308 preferably analyzes operating parameters with respect to appliances 330-338. This step may further involve analyzing environmental conditions in which appliances 330-338 operate. For example, appliance analyzer 308 may use environmental data measured with a plurality of sensors situated at or near the analyzed appliances 330-338. The environmental data may be indicative of temperature, humidity, pressure, averages of the foregoing measurements over a time period, etc. More specifically, appliance analyzer 308 may be configured to identify maintenance/repair issues based upon environmental conditions in conjunction with operating parameters.

At 410, appliance analyzer 308 preferably identifies one or more maintenance/repair issues with respect to appliances 330-338. As nonlimiting examples, the maintenance/repair issue can be any one or more of the following: a need for replacement of the appliance 330-338 or a component thereof, a need for repair of the appliance 330-338 or a component thereof, a need for battery recharging, lifespan expired, lifespan below a predefined threshold, power inadequacy, appliance inoperability for intended purpose, inoperability of one or more functions (electrical and/or mechanical), network connectivity failure, and the like. For instance, appliance analyzer 308 may detect performance degradation of an appliance (e.g., refrigerator 330) upon either it's past operating performance efficiency and/or its operating performance falling outside of threshold values prescribed for it by a manufacturer. As another nonlimiting example, appliance analyzer 308 may detect a dirty filter in another appliance (e.g., HVAC component 332) and/or may detect degradation in HVAC component 332 performance likely contributable to a dirty filter element.

At 412, appliance analyzer 308 preferably determines whether accidental damage protection is needed with respect to appliances 330-338. For example, if appliance analyzer 308 determines that one or more of the appliances 330-338 is in need of replacement or repair due to accidental damage, appliance analyzer 308 may recommend a corresponding accidental damage protection insurance product. In a particular embodiment of the invention, the accidental damage coverage may cover accidental damage to the appliance 330-338 (such as damage caused by accidentally dropping appliance 330-338), and/or other loss of the appliance 330-338 (e.g., loss of the appliance 330-338 through theft, fire, storm, burglary, natural disasters, or other peril). As another example, accidental damage protection may cover accidental discharge, leakage or overflow of water or steam from within a plumbing, heating or HVAC system 332, sudden and accidental tearing apart, cracking, burning or bulging of a steam or hot water heating system or of appliances for heating water, sudden and accidental damage from artificially generated currents to electrical appliances, devices, fixtures and wiring. Accordingly, if analysis of the appliance informatics data detects, for example, leakage or overflow of water, appliance analyzer 308 may recommend accidental damage protection for one or more of the appliances 330-338 that may be damaged by such leakage or overflow.

At 414, appliance analyzer 308 preferably determines whether extended warranty coverage is needed with respect to appliances 330-338. In an embodiment of the present invention, an extended warranty may be an insurance product that can be purchased to cover the repair costs of product support or repair services beyond the warranty provider's original warranty period. An extended warranty may allow the policyholder to receive support and product repair services above and beyond what is provided by a base warranty associated with appliances 330-338. An extended warranty may take the form of a flexible duration extended warranty or a fixed duration extended warranty.

When offering flexible or fixed duration extended warranty coverage, appliance analyzer 308 may seek to charge a premium that both appeals to policyholders and results in profit. For example, the appliance analyzer 308 may offer a flexible extended warranty with a premium that is attractive to the policyholder because it can reduce expected support costs over the life of one or more appliances 330-338 covered by the warranty. In an embodiment of the present invention, appliance analyzer 308 may place restrictions on an extended warranty product. For example, a flexible duration extended warranty can come with a restriction such that if a policyholder purchases coverage, the coverage must be started before the product reaches a pre-specified age. A flexible duration extended warranty can also come with a restriction such that the flexible extended warranty cannot be resumed once it is discontinued. In some instances, appliance analyzer 308 may require that extended coverage begins at the end of a warranty originally provided with the appliances 330-338 (e.g., a base warranty).

Thus, at 414, appliance analyzer 308 may determine expected base warranty expiration dates for the plurality of appliances 330-338, for example, based on the age of the appliances 330-338, as determined in step 406 mentioned above. In response to determining that the current date is later than the expected warranty expiration date for a particular appliance 330-338, appliance analyzer 308 may recommend corresponding extended warranty coverage for that appliance 330-338.

At 416, appliance analyzer 308 preferably analyzes operating parameters of refrigerator 330 to determine whether a policyholder might be interested in purchasing food spoilage protection insurance plan. For instance, appliance analyzer 308 may detect performance degradation of refrigerator 330 upon either it's past operating performance efficiency and/or its operating performance falling outside of threshold values prescribed for it by a manufacturer. In response, appliance analyzer 308 may recommend a food spoilage protection plan in addition to recommended repairs. A food spoilage protection product may take the form of a flexible duration. For instance, such plan may reimburse up to $300 per claim on three-year plan and/or up to $500 per claim on five-year plans for incurred spoilage losses. In an alternative embodiment, appliance analyzer 308 may recommend food spoilage protection plan in response to detecting frequently occurring power outages.

At 418, policy analyzer 308 preferably automatically generates a comprehensive set of appliance insurance product recommendations based on the analysis performed at steps 404-416. In an embodiment of the present invention, policy analyzer 308 may be configured to determine a multiple product discount value, which can apply to combinations of multiple insurance products and/or combinations of multiple appliances.

It is to be appreciated policy analyzer 308 may be further configured and operational to electronically receive an insurance policy that is associated with the insured property 300. Policy analyzer 308 then analyzes the received insurance policy for the insured property 300 to determine if one or more appliances and/or systems located in the insured property 300 are covered by the insurance policy. Analysis is then performed on the received informatic data to determine one or more insurance products providing insurance coverage for one or more appliances and/or systems located in the insured property 300, which insurance coverage is determined not to be provided by the analyzed insurance policy for the insured property 300.

At 420, policy analyzer 308 preferably provides a notification indicating suggested appliance insurance product recommendations. It is to be appreciated that policy analyzer 308 may be configured to electronically deliver all notifications regarding recommended insurance products or services. The notification can be anything that advises a policyholder, device, or computer system of the suggested changes, including but not limited to, a display of text on a local display screen, a message in an email sent to a local or remote computer, a text message, a communication to a remote computer system. It is to be also understood and appreciated that policy analyzer 308 may be configured and operational to integrate with policy holder's communicative computing devices (e.g., smart phones (via an app), computers, tablets, smart TV's, vehicle communication systems, kitchen communication systems, etc.) for sending such notifications regarding insurance product recommendations. In an embodiment of the present invention, each notification may include, but not limited to, a recommendation to perform insurance related repairs based on the determined repair needs, a recommendation of one or more vendors to perform insurance related repairs based on the determined repair needs, additional insurance products and services, and the like. Additionally, policy analyzer 308 may save the aforementioned recommendations in the insurance server's 106 storage component. These recommendations may then be automatically communicated to the policyholder and/or reflected in the policyholder's next insurance billing statement.

With certain illustrated embodiments described above, it is to be appreciated that various non-limiting embodiments described herein may be used separately, combined or selectively combined for specific applications. Further, some of the various features of the above non-limiting embodiments may be used without the corresponding use of other described features. For example, although the techniques are described above in the context of providing coverage for various items (such as personal property items), similar techniques may be used in the context of other types of property coverage or other types of insurance-related coverage. The foregoing description should therefore be con-

What we claim is:

1. A system comprising:
   one or more sensors associated with a refrigerator of an insured property; and
   a processor configured to:
      receive data from the one or more sensors;
      determine one or more operating parameters associated with the refrigerator based on the data, wherein the one or more operating parameters comprise a first age of the refrigerator, one or more second ages of one or more parts associated with the refrigerator, or a length of service of the refrigerator;
      determine whether a performance degradation of at least one of the one or more operating parameters associated with the refrigerator is within a threshold range based on the first age of the refrigerator, the one or more second ages of the one or more parts associated with the refrigerator, or the length of service of the refrigerator;
      determine a repair or a replacement need of the refrigerator in response to the performance degradation being outside the threshold range;
      receive an insurance policy associated with the insured property;
      determine one or more food spoilage coverage insurance products associated with the repair or the replacement need based on the insurance policy being indicative of a lack of coverage for the repair or the replacement need; and
      transmit an indication of at least one of the one or more food spoilage coverage insurance products to an electronic device associated with a policy holder that corresponds to the insurance policy.

2. The system of claim 1, comprising at least one additional sensor associated with at least one additional appliance, wherein the processor is configured to:
   receive the data and additional data from the additional sensor as an aggregated packet;
   parse the aggregated packet to classify one or more subsets of the data and the additional data based on a type of appliance;
   identify a first subset of the one or more subsets of the data and the additional data associated with the refrigerator; and
   determine the at least one of the one or more operating parameters associated with the refrigerator based on the first subset.

3. The system of claim 2, wherein the processor is configured to identify the policy holder associated with the insured property based on the first subset.

4. The system of claim 1, wherein the one or more operating parameters comprise an electrical power consumption, a temperature, a humidity, a pressure, or any combination thereof.

5. The system of claim 1, wherein the processor is configured to determine an average of the one or more operating parameters over a time period, wherein the performance degradation is based on determining whether the average is outside the threshold range.

6. The system of claim 1, wherein the threshold range is prescribed by a manufacturer of the refrigerator.

7. The system of claim 1, wherein the processor is configured to determine one or more additional insurance products comprising an accidental damage coverage, an extended warranty coverage, or both.

8. The system of claim 1, wherein the one or more food spoilage coverage insurance products are associated with reimbursing up to one or more threshold amounts for incurred spoilage losses in a time duration.

9. The system of claim 4, wherein the processor is configured to determine the performance degradation based on receiving the data indicative of the electrical power consumption, the temperature, the humidity, the pressure, or the combination thereof.

10. A system comprising:
    one or more sensors associated with a refrigerator of an insured property; and
    a processor configured to:
       receive data from the one or more sensors;
       determine one or more operating parameters associated with the refrigerator based on the data, wherein the one or more operating parameters comprise a first age of the refrigerator, one or more second ages of one or more parts associated with the refrigerator, or a length of service of the refrigerator;
       determine whether a performance degradation of at least one of the one or more operating parameters associated with the refrigerator is within a threshold range based on the first age of the refrigerator, the one or more second ages of the one or more parts associated with the refrigerator, or the length of service of the refrigerator;
       determine one or more food spoilage coverage insurance products for the refrigerator in response to the performance degradation being outside the threshold range; and
       transmit an indication of the one or more food spoilage coverage insurance products to a policy holder of the insured property.

11. The system of claim 10, wherein the processor is configured to determine a repair or a replacement need of the refrigerator in response to the performance degradation being outside the threshold range for determining the one or more food spoilage coverage insurance products.

12. The system of claim 10, wherein the data comprises an electricity usage of the refrigerator.

13. The system of claim 10, comprising one or more additional sensors associated with one or more additional appliances of the insured property, wherein the one or more additional appliances comprise one or more kitchen appliances, one or more HVAC components, a water purification system, a media entertainment system, one or more networking components, an electrical generator system, or any combination thereof, wherein the processor is configured to:
    receive additional data from the one or more additional sensors;
    determine one or more additional operating parameters associated with the one or more additional appliances based on the additional data;
    determine whether an additional performance degradation of at least one of the one or more additional appliances is within a respective threshold range;
    determine one or more available insurance products for the at least one of the one or more additional appliances in response to the additional performance degradation being outside the threshold range; and transmit an indication of the one or more available insurance products to the policy holder.

14. The system of claim 10, wherein the processor is configured to determine at least one immediate repair or replacement need, preventive repair or replacement need, or both, based on determining that the performance degradation of the one or more operating parameters is outside the threshold range.

15. The system of claim 10, wherein the processor is configured to:

receive the data and additional data as an aggregated packet;

parse the aggregated packet to classify one or more subsets of the data and the additional data based on a type of appliance;

identify a first subset of the one or more subsets of the data and the additional data associated with the refrigerator; and determine the at least one of the one or more operating parameters associated with the refrigerator based on the first subset.

16. A method, comprising:

receiving, by a processor, data from one or more sensors associated with a refrigerator of an insured property;

determining, by the processor, one or more operating parameters associated with the refrigerator based on the data, wherein the one or more operating parameters comprise a first age of the refrigerator, one or more second ages of one or more parts associated with the refrigerator, or a length of service of the refrigerator;

determining, by the processor, that a performance degradation of at least one of the one or more operating parameters associated with the refrigerator is outside a threshold range based on the first age of the refrigerator, the one or more second ages of the one or more parts associated with the refrigerator, or the length of service of the refrigerator;

determining, by the processor, a repair or a replacement need of the refrigerator based at least in part on determining that the performance degradation of at least one of the one or more operating parameters associated with the refrigerator is outside the threshold range;

receiving, by the processor, an insurance policy associated with the insured property;

determining, by the processor, one or more food spoilage coverage insurance products associated with the repair or the replacement need based on the insurance policy being indicative of a lack of coverage for the repair or the replacement need; and transmitting, by the processor, an indication of at least one of the one or more food spoilage coverage insurance products to a policy holder that corresponds to the insurance policy.

17. The method of claim 16, wherein the one or more operating parameters comprise humidity, pressure, or any combination thereof, internal parameters comprising a battery charge state, a length of service, an electric power consumption, an operational state, a performance efficiency, a network connectivity state, or a combination thereof.

18. The method of claim 16, wherein the processor is configured to determine one or more additional insurance products comprising an insurance product related to an age of the refrigerator or related to an appliance maintenance condition associated with the refrigerator.

19. The method of claim 16, comprising determining, by the processor, an accidental damage coverage, an extended warranty coverage, or both based on the insurance policy being indicative of a lack of coverage for the repair or the replacement need.

20. The method of claim 16, comprising:

receiving, by the processor, the data and additional data as an aggregated packet;

parsing, by the processor, the aggregated packet to classify one or more subsets of the data and the additional data based on a type of appliance;

identifying, by the processor, a first subset of the one or more subsets of the data and the additional data associated with the refrigerator; and determining, by the processor, the at least one of the one or more operating parameters associated with the refrigerator based on the first subset.

* * * * *